United States Patent
Karri et al.

(10) Patent No.: US 12,117,858 B2
(45) Date of Patent: Oct. 15, 2024

(54) MANAGING WATERPIPE SYSTEMS FOR SMART BUILDINGS

(71) Applicant: International Business Machines Corporation, Armonk, NY (US)

(72) Inventors: Venkata Vara Prasad Karri, Visakhapatnam (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 299 days.

(21) Appl. No.: 17/109,496

(22) Filed: Dec. 2, 2020

(65) Prior Publication Data
US 2022/0171414 A1 Jun. 2, 2022

(51) Int. Cl.
*G05D 7/06* (2006.01)
*E03B 7/08* (2006.01)
*E03C 1/00* (2006.01)
*E03C 1/10* (2006.01)
*F16L 55/00* (2006.01)
*G05B 13/04* (2006.01)

(52) U.S. Cl.
CPC ............. *G05D 7/0688* (2013.01); *E03B 7/08* (2013.01); *E03C 1/00* (2013.01); *E03C 1/10* (2013.01); *F16L 55/00* (2013.01); *G05B 13/048* (2013.01)

(58) Field of Classification Search
None
See application file for complete search history.

(56) References Cited

U.S. PATENT DOCUMENTS

| | | | | |
|---|---|---|---|---|
| 5,207,923 A * | 5/1993 | Wese | ........................ | C02F 1/54 134/13 |
| 2010/0292844 A1* | 11/2010 | Wolf | ........................ | C02F 9/00 700/271 |
| 2012/0060932 A1* | 3/2012 | Gutierrez-Wolf | ....... | E03B 1/044 137/2 |
| 2014/0182691 A1* | 7/2014 | James | ..................... | F16K 31/53 236/12.14 |

(Continued)

FOREIGN PATENT DOCUMENTS

| CN | 100552423 C | | 10/2009 |
|---|---|---|---|
| CN | 111340948 A | * | 6/2020 |
| JP | 2009197486 A | * | 9/2009 |

OTHER PUBLICATIONS

Bhowmik, et al., "Digital Twin of Subsea Pipelines: Conceptual Design Integrating IoT, Machine Learning and Data Analytics." Published May 2019. 9 pages. Offshore Technology Conference. Houston, Texas, USA. https://www.onepetro.org/conference-paper/OTC-29455-MS.

(Continued)

*Primary Examiner* — David Earl Ogg
(74) *Attorney, Agent, or Firm* — Haley J. McClory

(57) ABSTRACT

A processor may receive an input dataset. The input dataset may include a plurality of waterpipe components and one or more performance factors of the waterpipe system. A processor may generate a digital twin of the waterpipe system using the input dataset. A processor may simulate, using the digital twin, one or more features of the waterpipe system. The simulating may include a forecast having one or more predicted conditions associated with the waterpipe system.

18 Claims, 5 Drawing Sheets

(56) References Cited

U.S. PATENT DOCUMENTS

| | | | | | |
|---|---|---|---|---|---|
| 2014/0305513 | A1* | 10/2014 | Mcdowell | ............... | G01M 3/04 |
| | | | | | 73/40.5 R |
| 2017/0297939 | A1* | 10/2017 | Tseng | ..................... | B01J 20/103 |
| 2018/0137219 | A1* | 5/2018 | Goldfarb | ................ | G06N 20/10 |
| 2019/0383783 | A1* | 12/2019 | Azpiroz | ................ | G08B 21/12 |

OTHER PUBLICATIONS

Kritpiphat, et al.,"Pipeline Network Modeling and Simulation for Intelligent Monitoring and Control: A Case Study of a Municipal Water Supply System." Published Jan. 24, 1998. Ind. Eng. Chem. Res. 1998, 37, pp. 1033-1044. Published by American Chemical Society. https://pubs.acs.org/doi/full/10.1021/ie970424a.

Lek, E., "Digital twin strategy improves offshore oil and gas production." Published Apr. 1, 2019. Accessed Aug. 21, 2020. 4 pages. Published by Offshore. https://www.offshore-mag.com/production/article/16763951/digital-twin-strategy-improves-offshore-oil-and-gas-production.

Mell, et al., "The NIST Definition of Cloud Computing," Recommendations of the National Institute of Standards and Technology, U.S. Department of Commerce, Special Publication 800-145, Sep. 2011, 7 pgs.

Mironov, et al., "Condition Monitoring of Operating Pipelines with Operational Modal Analysis Application." Published Dec. 2015. Transport and Telecommunication Journal. vol. 16, No. 4, pp. 305-319. https://trid.trb.org/view/1422243.

Mohammed, et al., "Machine Learning—Based Detection of Water Contamination in Water Distribution Systems." GECCO '18 Companion, Jul. 15-19, 2018, pp. 1664-1671. Kyoto, Japan. https://www.semanticscholar.org/paper/Machine-learning%3A-based-detection-of-water-in-water-Mohammed-Hameed/0a7125c9718f785c920fcfbbd3d0d2fddb8f3841.

* cited by examiner

MANAGING WATERPIPE SYSTEMS FOR SMART BUILDINGS

BACKGROUND

The present disclosure relates generally to the field of waterpipe management, and more particularly to identifying conditions within a waterpipe system.

Everyday water use requires the utilization of comprehensive and complex waterpipe systems. These waterpipe systems allow people to carry out everyday activities, ranging from hand washing to agricultural irrigation. As such, proper management of various waterpipe systems is necessary to prevent potential interruption of these activities.

SUMMARY

Embodiments of the present disclosure include a method, computer program product, and system for managing a waterpipe system. A processor may receive an input dataset. The input dataset may include a plurality of waterpipe components and one or more performance factors of the waterpipe system. A processor may generate a digital twin of the waterpipe system using the input dataset. A processor may simulate, using the digital twin, one or more features of the waterpipe system. The simulating may include a forecast having one or more predicted conditions associated with the waterpipe system.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
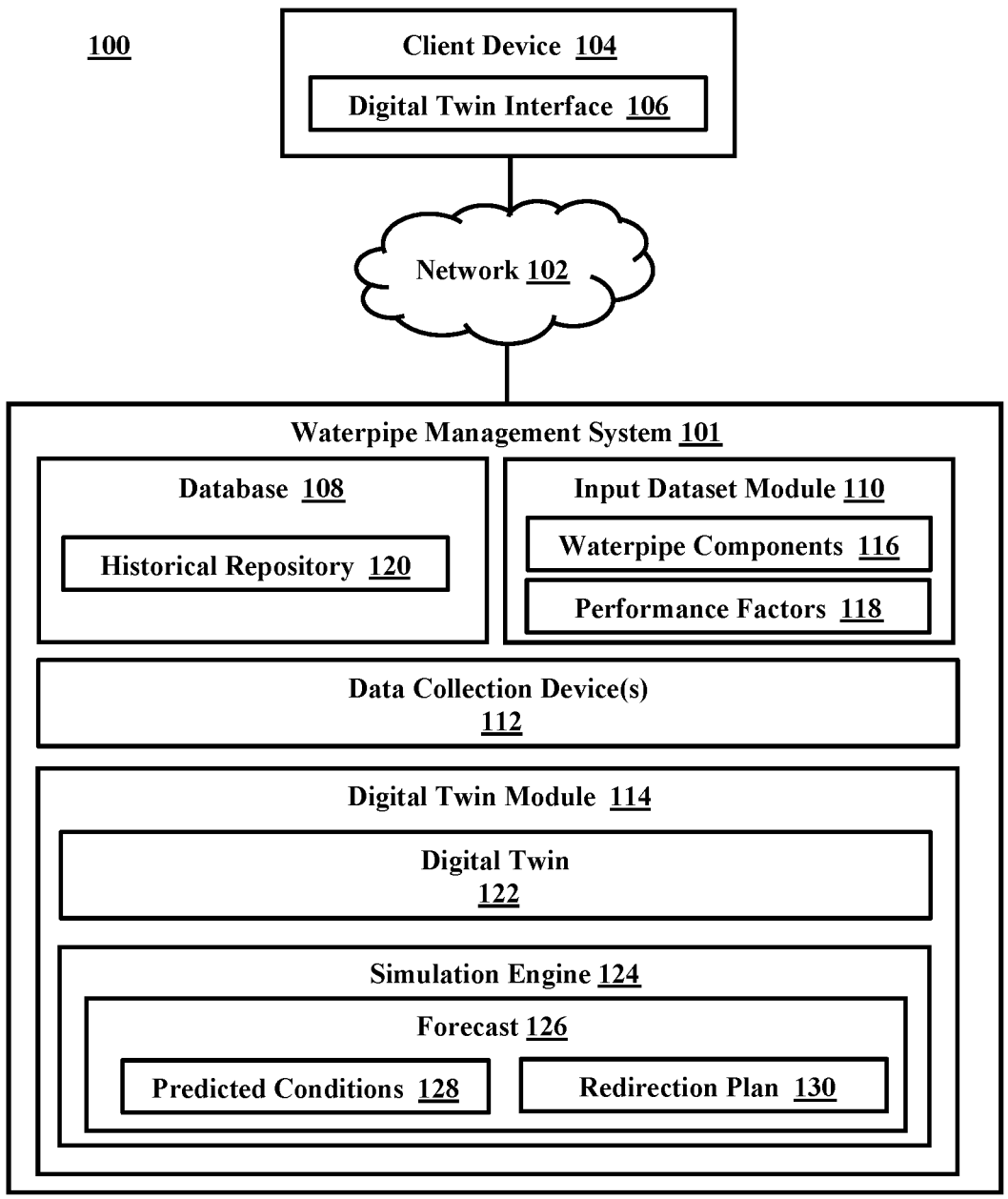
FIG. 1 depicts a block diagram of an embodiment of a computing environment for generating, modeling, and/or simulating a digital twin in accordance with the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of water management and more particularly to using digital twins to manage waterpipe systems. While the present disclosure is not necessarily limited to such applications, various aspects of the disclosure may be appreciated through a discussion of several examples using this context.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

It will be readily understood that the instant components, as generally described and illustrated in the figures herein, may be arranged and designed in a wide variety of different configurations. Accordingly, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments," "some embodiments," or other similar language, throughout this specification refers to the fact that a particular feature, structure, or characteristic described in connection with the embodiment may be included in at least one embodiment. Accordingly, appearances of the phrases "example embodiments," "in some embodiments," "in other embodiments," or other similar language, throughout this specification do not necessarily all refer to the same group of embodiments, and the described features, structures, or characteristics may be combined or removed in any suitable manner in one or more embodiments. Further, in the FIGS., any connection between elements can permit one-way and/or two-way communication even if the depicted connection is a one-way or two-way arrow. Also, any device depicted in the drawings can be a different device. For example, if a mobile device is shown sending information, a wired device could also be used to send the information.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application and to enable others of ordinary skill in the art to understand the disclosure for various embodiments with various modifications as are suited to the particular use contemplated.

Water is an essential resource that is transported and used every day through various waterpipe systems that can range in complexity from a single pipe to an intricate network of piping components. Such waterpipe systems allow for water to be transported directly to one or more particular points of access (e.g., an upstairs shower and kitchen sink). In order to accommodate for this type of water transport, waterpipe systems can utilize a plurality of components including, but not limited, various sized and shaped pipes, valves, pumps, and reservoirs, to ensure water is readily available at each particular access point. While waterpipe systems offer a cornucopia of benefits, a variety of problems still plague these systems.

One such problem includes the degradation of one or more of the plurality of components of the waterpipe system. Degradation can occur in waterpipe systems for a variety of reason, such as wear occurring over time, environmental conditions (e.g., low freezing temperatures), or water performance factors (e.g., high pressure or particular contamination level). Such degradation can result in water escaping the waterpipe system and causing damage to the surrounding environment. Depending on the amount of water escaping or leaking from the waterpipe system the problem can cause structural damage and/or can lead to moisture accumulation. Moisture accumulation, when not immediately addressed, can result in the growth of bacteria and fugus that can cause structural rot or erosion, as well as significant health and safety concerns. In addition, the water escaping (e.g., leaking) from the waterpipe system is lost and cannot be recaptured for use in the system. This loss of water from the waterpipe system can result in a significant increase in water waste and decrease the efficiency of the waterpipe system.

In recent years, water waste has been identified as a key issue resulting from the increased awareness of water pollution and, in some regions of the world, water scarcity. Traditional waterpipe systems can be wasteful. Often water transported to a specific access point is only used for one purpose (e.g., washing produce in a sink) before it is considered wastewater and reenters the waterpipe system via a drain and is disposed of In these traditional systems, the wastewater is removed and combined with other types of wastewater, such as water accumulated after a shower, before being funneled into the sewer system. In these traditional waterpipe systems, because water is only used for one purpose, often the water considered wastewater only has a small concentration or number of contaminants. While these contaminants may preclude the water from being used for some purposes (e.g., human consumption), the water can be repurposed for other uses or activities (e.g., watering a garden). Accordingly, there is a need for a smart waterpipe system that can identify and minimize, not only damage to the waterpipe system and the damage potentially caused the by waterpipe system, but also ensure water is not unnecessarily wasted.

As such, the present disclosure provides embodiments associated with managing and simulating a waterpipe system that reduces water waste, potential damage to the waterpipe system, and to the environment surrounding the waterpipe system. In embodiments, an artificial intelligence enabled digital twin simulation engine is generated to simulate a waterpipe system. A digital twin can simulate a particular waterpipe system and take into consideration various factors and conditions of the waterpipe system including, but not limited to, the water quality, pattern of scaling, rusting, blockages or jams in the valves or pipes, and weakening in one or more of the plurality of waterpipe system components. In addition, the digital twin simulation engine can also simulate how the water might be contaminated at different stages of water flow at a particular water access point, and how the contaminated water can be reused for a different purpose.

Waterpipe management systems, such as those discussed herein, can also be employed for other uses, such as firefighting, agricultural purposes (e.g., basic gardening or crop irrigation), textile industry, breweries (e.g., and other food/drink related industries where untimely identification of contaminants could affect consumer health), and pulp and paper industries. The aforementioned waterpipe systems can have a variety of other properties different from traditional residential waterpipe systems. These properties include, but are not limited to, different types of water hardness, different water pressures (e.g., firefighting waterpipe systems often require high water pressure), and different configurations (e.g., crop irrigation requires waterpipe components to span long distances). Because of these different properties and configurations, each waterpipe system can incur different types of damages. In these waterpipe systems, often where the damage has occurred and remedying the damage is difficult to detect and is often not detected until the waterpipe system fails in some way (e.g., water does not arrive at expected access point). As such, a method of preventing waterpipe system breakdown is needed.

The following disclosure provides various embodiments for a waterpipe management system that can leverage the use of digital twin technology to improve the management of waterpipe systems. In embodiments, an input dataset comprising data associated with the waterpipe system is received by a processor. The input dataset can include information about the plurality of components (e.g., pipes, valves, pumps, etc.) that make up the composition of the waterpipe system and one or more performance factors (environmental factors, piping parameters, water parameters, etc.). In embodiments, a digital twin of the waterpipe system is generated using the input dataset. The digital twin of the waterpipe system can simulate one or more features of the waterpipe system and generate a forecast having one or more predicted conditions associated with the waterpipe system.

A forecast may include, but is not limited to, one or more recommended actions, one or more recommended redirection plans, and in response to identifying one or more predicted conditions, recommending repairs to the waterpipe system, recommended maintenance schedules (e.g., when water usage is traditionally low), operating conditions or performance factors associated with the particular condition, and further recommendations for improving the overall health and longevity of the waterpipe system during various modes of operation or working conditions. Using digital twin technology can address the various other problems associated with traditional waterpipe systems, while also improving space and facility utilization, optimize accounting associated with waterpipe systems, and scale enterprises that utilize waterpipe systems.

Turning now to the figures, FIG. 1 depicts a computing environment 100, in accordance with embodiments of the present disclosure. In embodiments, waterpipe management system 101 leverages the use of digital twin technology to effectively manage a waterpipe system. FIG. 1 provides an illustration of only one embodiment and does not imply any limitations with regard to the environments in which different embodiments may be implemented. Many modifications to the depicted environment may be made by those skilled in the art without departing from the scope of the invention as recited by the claims.

Computing environment 100 can include network 102, client device 104, and waterpipe management system 101 (e.g., a system) for managing waterpipe systems. Waterpipe management system 101 can be implemented as an application running on a user's computing device (e.g., client device 104), as a service offered via the cloud, as a web browser plugin, as a smartphone application, or as a codependent application attached to a secondary application (e.g., as an "overlay" or a companion application to a partner application, such as text messaging application).

Network 102 can be any type or combination of networks. For example, network 102 can include any combination of personal area network (PAN), local area network (LAN), metropolitan area network (MAN), wide area network (WAN), wireless local area network (WLAN), storage area network (SAN), enterprise private network (EPN), or virtual private network (VPN). Network 102 can refer to an IP network, and may include one or more wired and/or wireless networks that are capable of receiving and transmitting data, voice, and/or video signals, including multimedia signals that include voice, data, and video information. For example, database 106 can communicate with various client devices 104 (e.g. tablets, laptops, smartphones, portable terminals, conferencing device components, client device 104, etc.) over the Internet.

In some embodiments, network 102 can be implemented within a cloud computing environment, or using one or more cloud computing services. Consistent with various embodiments, a cloud computing environment can include a network-based, distributed data processing system that provides one or more cloud computing services. Further, a cloud computing environment can include many computers (e.g., hundreds or thousands of computers or more) disposed within one or more data centers and configured to share resources over network 102. Cloud computing is discussed in greater detail in regard to FIGS. 3A-4.

Client device 104 can be a laptop computer, tablet computer, smartphone, smartwatch, or any other computing device that allows for a client/user to interact with and execute the methods and/or techniques described herein. In various embodiments, client device 104 can provide a client/user with information and/or one or more findings identified by waterpipe management system 101 via digital twin interface 106. Digital twin interface 106 can provide an interface between client device(s) 104 and waterpipe management system 101.

Digital twin interface 106 can be a graphical user interface (GUI), a web user interface (WUI) or any other suitable interface for a user to interact with and execute the methods and/or techniques described herein. As described herein, this information can be provided to a client/user in any format. For example, information can be relayed to a client/user via client device 104 via video, audio, images, and or text (e.g., charts or waterpipe system readings) that is transmitted, communicated, or otherwise provided by waterpipe management system 101. Client device 104 can represent any programmable electronic devices or combination of programmable electronic devices, capable of executing machine readable program instructions and as well as capable of communicating with other computing devices (not shown) within computing environment 100 via network 102. Furthermore, client device 104 can comprise a plurality of devices, both stationary and portable, that enable a user to be mobile during a conference meeting.

Waterpipe management system 101 can be a standalone computing system, a server, and/or a virtualized system running on one or more servers within a cloud networking environment capable leveraging digital twin technology to manage a waterpipe system. Waterpipe management system 101 can include database 108, input dataset 110, Data collection device(s) 112, and digital twin module 114. The term "module" may refer to a hardware module, software module, or a module may be a combination of hardware and software resources. Embodiments of hardware-based modules may include self-contained components such as chipsets, specialized circuitry, one or more memory devices and/or persistent storage (see FIG. 4). A software-based module may be part of a program (e.g., programs 428, FIG. 4), program code or linked to program code containing specifically programmed instructions loaded into a memory device or persistent storage device of one a data processing systems operating as part of the computing environment 100. For example, data associated with digital twin module 114, depicted in FIG. 1, can be loaded into memory or a database, such as database 108.

In embodiments, client device 104 can be a component of waterpipe management system 101. In these embodiments, client device 104 can include all of the components, or fewer than all the components necessary to implement waterpipe management system 101. For example, input dataset module 110, can be configured on client device 104 while digital twin module 114 can be configured on a separate device.

In embodiments, waterpipe management system 101 can include database 108, input dataset module 110, data collection device(s) 112, and digital twin module 114. Waterpipe management system 101 can be configured to manage any type of waterpipe system that uses pipes and other piping components to direct waterflow (e.g., to a kitchen sink faucet or an outside spicket). These waterpipe systems can include, but are not limited to, any configuration of pipes and piping components used in a single room, a house, apartment building, residential block, industrial use building, town water system, or any combination thereof that can be implemented above or below ground. While in some embodiments, waterpipe systems managed by waterpipe management system 101 includes water input systems that act as a source of water to a particular access point (e.g., associated piping directing waterflow to a showerhead), in other embodiments, the waterpipe system managed by water management system 101 also includes the water output systems or drainage system that removes water after it is used (e.g., a shower drain and associated piping directing the waterflow of wastewater). The waterpipe system managed by waterpipe management system 101 can be a physical waterpipe system that is already built (e.g., already in use in a house or building) or can also be a proposed design (e.g., a blueprint of the waterpipe system).

In embodiments, database 108 can be configured to store a wide variety of information and different data types, as contemplated herein. While in some embodiments database 108 is a single database configured to maintain one or more libraries of information and historical repository 120, in other embodiments, historical repository 120 is separately situated from database 108. In embodiments, database 108 can include one or more libraries of data including, but not limited to, water quality standards, piping parameters, piping structures, data associated with water conditions, data associated with environmental conditions, and any other data necessary to manage a waterpipe system, as contemplated herein. Such data can be accessed from database 108 by waterpipe management system 101, or individually by input dataset module 110 and/or digital twin module 114, as needed. Database 108 may be configured to store data in various formats including, but not limited to audio and video recordings, readings, images, repositories of system data (e.g., client preferences), and/or any other data format type that can be capable of storing relevant waterpipe system data used by waterpipe management system 101. In embodiments, database 108 can reside on a single server, on multiple servers within a cloud computing environment, on client system 104 and/or on the same physical system or virtualized system as waterpipe management system 101.

In embodiments, waterpipe management system 101 can include historical repository 120. In some embodiments, historical repository 120 can be independently situated from other components in waterpipe management system 101, while in other embodiments, historical repository 120 can be a component of, database 108, digital twin module 118, input dataset module 110, or any combination thereof. In embodiments, waterpipe management system 101 can configure historical repository 120 to receive and store information or data analyzed or determined from a particular waterpipe system managed by waterpipe management system 101.

In embodiments, waterpipe management system 101 is configured to receive one or more input datasets via input dataset module 110. Input dataset module 110 can provide waterpipe management system 101 with information and data (e.g., input dataset) about one or more particular waterpipe systems to be managed by the system. In embodiments, input dataset module 110 can be configured to receive one or more waterpipe system documents or digital files. In these embodiments, input dataset module 110 can be configured to convert the documents or digital files into one or more input datasets having plurality of waterpipe components 116 and/or one or more performance factors 118. Input datasets, derived from documents or digital files, can be used to infer how a particular waterpipe system would be configured (e.g., waterpipe components 116) and perform (e.g., performance factors 118) if the design was implemented in real-life.

In embodiments, plurality of waterpipe components 116 can include, but is not limited to, pipes, pumps, valves, or any other component that can be used in a waterpipe system. In some embodiments, waterpipe components 116 can further include how each component is configured and/or data information associated particular waterpipe components. For example, plurality waterpipe components 116 can include information and data not only associated with a particular piping configuration (e.g., bent pipe is connected to a particular valve), but also data regarding various brands of waterpipe components, possible waterpipe component material, and one or more waterpiping parameters. Waterpiping paraments can include, but is not limited to, crack growth resistance, environmental stress crack resistance, tensile and compressive strength, minimum and maximum pressure limits, pipe diameter, and pipe wall thickness. In some embodiments, input dataset can provide partial information that can be linked to additional data or information stored in database 108. For example, input dataset module 110 could identify a particular brand of pipe from the input dataset, and retrieve relevant data or piping parameters (e.g., safe operational pipe pressure ranges) associated with that particular brand of piping stored in database 108.

In embodiments, performance factors 118 can include one or more factors that influence how the waterpipe system functions and performs when waterpipe system is in use. More particularly, performance factors 118 can provide information and data about how use of the waterpipe system influences one or more of the plurality of waterpipe components 116 and can include any factor that affects the operational use (e.g., flow of water) of the waterpipe system. Performance factors 118 can include, but are not limited to, water velocity, water acidity, temperature, external waterpipe components 116 conditions (e.g., soil conditions that can affect waterpipe components 116), and internal waterpipe components 116 conditions (e.g., contaminants within one or more waterpipe components 116 that can affect the conditions of the component).

In embodiments where one or more of the plurality of waterpipe components 116 are not definitively identified from the documents or digital files (e.g., input dataset) or performance factors 118 are not provided in either the documents or database 108, waterpipe management system 101 can be configured to determine what the missing waterpipe components 116 or performance factors 118 are. In some embodiments, waterpipe management system 101 can identify that one or more of the plurality of waterpipe components 116 or one or more performance factors 118 are missing and send a message to client device 104 indicating that the information is not available.

In these embodiments, waterpipe management system 101 can, using various methods contemplated herein: i) request a client/user to input information or data associated with the missing waterpipe component or missing performance factor; ii) make a recommendation on what the one or more missing waterpipe components or performance factor should be (e.g., use machine learning to extrapolate a similar waterpipe component or performance factor, based, at least in part, on the information and data from input dataset module 110 and database 108 and/or historical repository 120); iii) automatically select the most likely waterpipe component or performance factor that would fulfill the missing waterpipe component or performance factor role; or iv) any combination thereof.

In embodiments, input dataset module 110 can be configured to receive information and data (e.g., plurality of waterpipe components 116 and/or performance factors 118) regarding a particular waterpipe system and how the waterpipe system performs via one or more data collection devices 112. In some embodiments, data collection device(s) 112 can be connected or coupled to, or in close proximity to, one or more of the plurality of waterpipe components 116 that make up the waterpipe system (e.g., one or more data collection devices 112 can be coupled to a pipe, pump, and/or valve). Data collection device(s) 112 can include, but are not limited to, one or more sensors, IoT (Internet of Things) devices, and recording systems configured to capture performance factors 118 associated with a particular waterpipe system. In these embodiments, waterpipe management system 101 can configure one or more data collection devices 112 to identify one or more of the plurality of waterpipe components 116 and/or performance factors 118 of the waterpipe system to provide a real-time data feed.

In embodiments, waterpipe management system 101 can configure data collection devices 112 to provide, not only a real-time feed of the status of the waterpipe system, but can also provide data and information (e.g., performance factors 118) regarding conditions surrounding one or more of the plurality of waterpipe components 116 of the waterpipe system (e.g., acidity of soil surrounding a pipe). As discussed herein, performance factors 118 can include any element/factor that is capable of affecting how the waterpipe system functions. Input dataset module 110 can be configured to receive information and data collected from data collection device(s) and identify one or more performance factors 118 that affect a particular waterpipe system in real-time.

These performance factors 118 can include, but are not limited to: i) actual condition of waterpipe component 116, such as pipe weakening, rusting, cracking, leaking, etc.; ii) data readings of one or more waterpipe component 116 under different conditions (e.g., pipe pressure readings during freezing temps), iii) data readings associated with the condition of the waterpipe system environment, such as temperature, UV exposure, soil composition, etc.; iv) real-time data associated with water conditions and waterflow through the waterpipe system, such as water velocity, water temperature, water acidity, waterpipe system environmental conditions and water contamination types and levels of contamination.

In some embodiments, data collection device(s) 112 can provide input dataset module 110, with sufficient data (e.g., one or more input datasets) to define the plurality of waterpipe components 116 and performance factors 118 associated with the waterpipe system of interest. In other embodiments, input dataset module 110 can configure the data and information collected by one or more data collection device(s) 112 and combine it with a document or digital file of the waterpipe system (e.g., blueprint of waterpipe system) to define the plurality of waterpipe components 116 and performance factors 118 associated with the waterpipe system of interest. In embodiments, digital twin module 114 can be configured to receive waterpipe components 116 and performance factors 118 from input dataset module 110 with the waterpipe system. In these embodiments, digital twin module 114 can generate digital twin 122 and simulate one or more features of a particular waterpipe system to provide a client/user with a forecast 126.

While in some embodiments, waterpipe management system 101 can configure one or more data collection devices 112 to provide a "snapshot" depicting the state of the waterpipe system at a particular instance, in other embodiments, waterpipe management system 101 can configure one or more data collection devices 112 to provide a more comprehensive surveillance of the waterpipe system. In embodiments, waterpipe management system 101 can configure one or more data collection devices 112 to: i) constantly survey the waterpipe system and relay the information and data to waterpipe management system 101; ii) intermittently survey the waterpipe system (e.g., timed intervals); iii) data collection device(s) 112 can be configured to relay information only when there is information indicating a significant change in one or more waterpipe components 116 or performance factors 118 the waterpipe system; or any combination thereof. Waterpipe management system 101 can configure one or more data collection devices 112 to collect and store this observed or historical data in historical repository 120. In embodiments, the historical data stored in historical repository 120 can be used by input dataset module 110 to define waterpipe configuration and/or by digital twin module 114 to generate digital twin 122 and enable waterpipe management system 101 to simulate digital twin 122 and generate forecast 126 using simulation engine 124.

In embodiments, waterpipe management system 101 can use the historical data stored in historical repository 120, to produce predicted conditions of one or more features of the waterpipe system. In embodiments, waterpipe management system 101 can configure the historical data stored in historical repository 120 to identify one or more observed performance factors in the waterpipe system that can indicate a potential change in one or more of the plurality of waterpipe components 116 and/or other performance factors 118. For example, one or more data collection devices 112 over a period of time can observe that an increase in water pH (e.g., observed performance factor) at a particular location within the waterpipe system, increases the occurrence of rust (potential change) inside one of the waterpipe components 116. The occurrence of rust can then affect other performance factors 118, such as the type and level of water contaminants in the waterpipe system. In embodiments, waterpipe management system 101 can discern, using statistical modeling, deep learning models, machine learning models, or a combination thereof, if and how a particular performance factor 118 will influence one or more waterpipe components 116 and other related performance factors 118 of the waterpipe system (e.g., how the increase in water velocity results in an increase in pressure).

In embodiments, waterpipe management system 101 can use the aforementioned techniques to identify historical patterns from the historical data collected by one or more data collection devices 112 and stored in historical repository 120. An historical pattern can include, but is not limited to, identifying one or more particular performance factors 118 observed from one or more data collection devices 112 that causes a particular condition to one or more waterpipe components 116 in the waterpipe system, determining the effect of a particular performance factor 118 on one or more waterpipe components 116 over a particular period of time, determining the time period associated with the worsening (or improving) condition of the waterpipe components 116, and determining how an observed performance factor (e.g., types and/or levels of contaminants in the water) impacts the waterflow through the waterpipe system and water use. Continuing with the above example, waterpipe management system 101 can use the various techniques contemplated herein (e.g., machine learning) and information stored in historical repository 120 to identify an historical pattern associated with the effects of an increase in water pH caused to one or more waterpipe components 116, such as, how much rust accumulates over a particular time duration that the increased pH is observed in the water, and how the increase in pH and likely rust components in the water affect water use (e.g., considering if the contaminant type and level/amount of contaminant in the water is safe for human consumption).

In embodiments, waterpipe management system 101 can be configured to manage and observe more than one particular waterpipe system. In such embodiments, historical repository 120 can be configured to store information and data associated with each waterpipe system. While in some embodiments, historical patterns for a particular waterpipe system are determined from the historical data observed/collected only from that particular waterpipe system, in other embodiments, waterpipe management system 101 can configure historical repository 120 to identify historical patterns associated with historical data observed/collected from all waterpipe systems managed by waterpipe management system 101. For example, in these embodiments, if waterpipe management system 101 manages waterpipe system A and waterpipe system B, a historical pattern identified from the historical data associated with waterpipe system A can be used by digital twin module 114 to simulate waterpipe system B if waterpipe system B has similar waterpipe components 116 and performance factors 118 as those found in waterpipe system A, even if each waterpipe system A and waterpipe system B is configured differently for different purposes. For example, if waterpipe system A is a waterpipe system for a house and waterpipe system B is a waterpipe system for an industrial building, but both waterpipe systems have a particular type of pipe then if a historical pattern is identified associated with the historical data collected from waterpipe system A and the particular pipe, then that particular historical pattern can be used by digital twin module 114 to simulate the digital twin of waterpipe system B.

In embodiments, waterpipe management system 101 can be configured to generate a digital twin 122 of a particular waterpipe system using digital twin module 114. Digital twin module 114 can further include simulation engine 124. In embodiments, digital twin module 114 can be configured to receive one or more input datasets form input dataset module 110 associated with the particular waterpipe of interest to generate one or more digital twins 122. While commonly known in the art, digital twins, such as digital twin 122, are generated using various artificial intelligence techniques to create a digital representation that mimics the structure and performance of a particular waterpipe system of interest. Using digital twin 122 of a particular waterpipe system, one or more features of the waterpipe system can be simulated by simulation engine 124.

In embodiments, waterpipe management system 101 can provide digital twin services via digital twin module 114 to clients/users connecting and assessing digital twin module 114 via client device 104. In these embodiments, the digital twin services and/or access may be provided to owners, purchasers, licensees, manufacturers, sellers, licensors, and other authorized individuals (collectively referred to herein as "client/users") of the digital twins being accessed. Embodiments of waterpipe management system 101 may execute program code of digital twin module 114, including, but not limited to, i) retrieving and creating digital twin 122 models; ii) aggregating, organizing, and storing data generated by data collection device(s) 112 (e.g., sensor devices, IoT devices, and or recording systems) associated with the waterpipe system of interest; and iii) monitoring changes in the operating conditions of the waterpipe system, including operation and changes associated with of plurality of waterpipe components 116 (e.g., pipes, valves, pumps etc.) and performance factors 118 of the waterpipe system of interest as reflected by the digital twin.

In embodiments, waterpipe management system 101 can configure digital twin module 114 to simulate digital twin 122 using simulation engine 124. In these embodiments, simulation engine 124 can simulate one or more features of the waterpipe system (i.e., digital twin of the waterpipe system) to generate a forecast. In these embodiments, one or more features can refer to any element of the waterpipe system that is of interest to a client/user. Waterpipe management system 101 can determine how one or more features (e.g., particular waterpipe components 116 and/or particular performance factors 118) of a waterpipe system are influenced when a particular stimuli or change is applied to a waterpipe system by applying a simulation (e.g., via simulation engine 124) of the stimuli to the digital twin 122 of the waterpipe system. Examples of simulated features include, but are not limited to, how one or more features (e.g., waterpipe components 116 and performance factors 118) system performs at particular temperatures, how the waterpipe system performs over a particular time duration, if some portion the water contained within the waterpipe system has contaminants, what the contaminants in the waterpipe system are, and if the type and/or amount of water contaminants limit the use of that particular portion of water.

In embodiments, simulation engine 124 can be configured to receive historical data and historical patterns stored in historical repository 120 to generate forecast 126 having one or more predicted conditions 128 and/or redirection plans 130. Forecast 126 can have reports associated with simulation results to clients/users that can include, but are not limited to, recommendations and/or proposed actions to the clients/users, as well as predicated conditions 128 and redirection plans 130. One or more predicted conditions 128 can include, but are not limited to, predicting operating conditions of the waterpipe system, such as how waterpipe system performance factors 116 and/or one or more waterpipe components (e.g., condition of a pipe) are operating over time and into a future predicted timeframe, water conditions (e.g., type and amount of water contaminants), or any combination thereof.

In some embodiments, one or more one or more predicted conditions can also include, one or more recommended actions (e.g., to be automatically relayed to a user), repairs to the waterpipe system, recommended maintenance schedules (e.g., based on times of low water use), operating conditions or performance factors 118 associated with the particular simulation, other preventative measures for prolonging or maximizing the lifespan the waterpipe components 116 during various modes of operation or working conditions (e.g., winter conditions and summer conditions). These embodiments can optimize the use of water and one or more waterpipe components 116 while also minimizing the occurrence of waterpipe system breakdowns caused by the deterioration of the waterpipe system. One or more individual functions or features of the digital twin module 114 may be implemented by one or more subprocesses or sub-modules of the digital twin module 114. For example, in some embodiments, the exemplary embodiment of the digital twin module 114 depicted in FIG. 1, digital twin module 114 can include simulation engine 124, while in other embodiments digital twin module 114 can be configured to include, input dataset module 110, historical repository 120, and/or simulation engine 124.

In embodiments, forecast 126 can include one or more predicted conditions and/or redirection plans associated with any feature of the particular waterpipe system of interest. In some embodiments, forecast 126 via simulation engine 124 can provide one or more predicted conditions and a redirection plan 130 associated with ameliorating the one or more predicted conditions 128. In embodiments, forecast 126 may further provide a client/user with a description of parameters considered by simulation engine 124 while simulating the digital twin 122 of the waterpipe system to produce forecast 126. A client/user may review each of the forecasts comprising one or more predicted conditions 128 and/or redirection plans 130 and select one or more actions (e.g., schedule maintenance) associated with the one or more predicted conditions 128 to apply to the waterpipe system.

In embodiments, forecast 126 can further include one or more accuracy indicators, determined by digital twin module 114, indicating the accuracy of forecast 126 (e.g., using calculation of percent error). In some embodiments, while a high accuracy indicator can imply that some or all of the data used by digital twin module 114 to generate the one or more digital twins 122 and simulate the one or more forecast 126 is known or well understood, a low accuracy indicator can imply that some portion of relevant data associated with the waterpipe system of interest is omitted. In these embodiments relevant data can include, but is not limited to, any data associated with input dataset module 110, database 108, historical repository 120, data collection device(s) 112, or digital twin module 114, that is used to define the waterpipe system of interest. For example, relevant data could refer to specific piping parameters (e.g., safe pressure ranges) for a particular pipe (e.g., one or more waterpipe components 116) used in a waterpipe system. In this example, the pipe type could be identified as part of an input dataset associated with input dataset module 110, but the relevant data associated with the specific piping parameter (e.g., safe pressure ranges associated with the particular pipe) could be missing from the input dataset.

Relevant data can be omitted by digital twin module 114 for a variety of reasons including, but not limited to, determining that the relevant data is missing or unavailable within waterpipe management system 101 and/or determining the relevant data collected (e.g., from a broken data collection device 112) is, more likely than not, inaccurate. For example, one or more data collection devices 112 could be faulty (e.g., damaged by the environment) and provide waterpipe management system 101 with incorrect information. In these embodiments, waterpipe management system 101 may independently determine or receive an indication (e.g., via message from a data collection device 112 having a built-in self-test) that one or more of data collection devices 112 is defective and the data, if any data is received, should be disregarded or omitted. In other embodiments, waterpipe management system 101 can receive a data reading from one or more data collection devices 112 and determine that the data is inaccurate by comparing the data reading to the other data readings received by neighboring data collection devices 112 or by comparing the data reading to data readings collected and stored in historical repository 120. In these embodiments, waterpipe management system 101 can use techniques contemplated herein (e.g., machine learning) to identify whether the data reading is likely inaccurate and should be omitted or if the data reading is indicative of a particular condition of one or more of the plurality of waterpipe components 116 or change in one or more performance factors 118.

In embodiments, where relevant data is omitted from digital twin module 114 with the waterpipe system of interest, waterpipe management system 101 can utilize information from various libraries housed within database 108, historical repository 120, and one or more data collection device(s) 112 (e.g., a neighboring data collection device 112 proximate to the faulty data collection device 112) to fill in the missing data. In embodiments, where some portion of the data necessary to generate one or more digital twins 122 and/or to perform either the simulation via simulation engine 124 is omitted, waterpipe management system 101 can configure digital twin module 114 to make intelligent extrapolations based on the data available to make assumptions on the data missing. Depending on the data used to make the intelligent extrapolations, digital twin module 114 can assign a reliability score to the data used.

For example, data associated with a particular waterpipe system stored historical repository 120 could have a high reliability score when used to fill in omitted data/information needed to generate/simulate digital twin 122, while data from database 108 that could generically apply to many different waterpipe systems could have a lower reliability score. In embodiments, the various reliability scores used by digital twin module 114 can be accumulated to generate the one or more accuracy indicators. As discussed herein, the accuracy indicators can provide a confidence level to a client/user regarding how accurate the forecast 126 is and if the one or more predicted conditions 128 provided are more likely than not to occur in the actual waterpipe system 101. In embodiments where forecast 126 is based on historical repository 120 (e.g., and the data collected from the waterpipe system via data collection devices 112), as more data is collected over time digital twin module 114 and more particularly, simulation engine 124 can generate more accurate digital twins 122 and forecasts 126 as a result of having more data available associated with the particular waterpipe system.

In some embodiments, simulating a feature of digital twin 122 of a particular waterpipe system can include determining whether a portion of water within the waterpipe system is contaminated water. In traditional waterpipe systems, water is transported to a particular access point (e.g., a sink faucet) where it is usually given one use (e.g., rinse vegetables) before it is removed from the area via a removal point (e.g., sink drain) to the sewer system. In embodiments, waterpipe management system 101 can configure data from historical repository 120, data collection device(s) 112 and determine using, digital twin module 114 if the water used at a particular access point can be used for a secondary purpose (e.g., watering a garden) once the used water enters the removal point (but before the used water enters the sewer system). Waterpipe management system 101 can use information received from one or more data collection devices 112 to identify the origin of the water, analyze the type and number of contaminates (e.g., dirt, bacteria, and/or various chemicals) in the portion of water and analyze the concentrations of each of the one or more contaminates. In embodiments, waterpipe management system 101 can configure digital twin module to use the contaminant information received from one or more data collection devices 112 and historical repository 120 to determine whether the portion of water has one or more contaminates above a contamination threshold.

In embodiments, a contamination threshold can be exceeded in a variety of ways. When a contamination threshold is exceeded the portion of water is designated as wastewater and cannot be repurposed within the waterpipe system. In some embodiments, water can be considered to exceed a contamination threshold depending on the type of contaminants and the concentration of contaminants in the portion of water. For example, if a benign contaminant (e.g., rust particulates) having a very low concentration were to be analyzed within the portion of water, this water could likely be reused for a variety of purposes (e.g., washing dishes, watering the garden, etc.). Alternatively, if this same benign contaminant was found at a very high concentration within the portion of water, this could reduce the number of purposes (e.g., to only watering the garden), or if there are no available purposes (e.g., the concentration is too high), the contamination threshold would be exceeded. In other embodiments, a contaminant can be very toxic and even at low concentrations, if found within the portion of water analyzed by waterpipe management system 101, can exceed the contamination threshold.

As discussed herein, waterpipe systems can be configured in a variety of ways. As a result, depending on the technology associated with a waterpipe system, such as "smart" waterpipe systems, a contamination threshold can be higher than that of a more traditional waterpipe system. A "smart" waterpipe system can have a higher contamination threshold because a such systems can have more technology associated with repurposing the portion of water that is contaminated. For example, a waterpipe system could have various filters that remove chemicals or particulates, or chemical treatments that allow water to be, at least in part, "cleaned." These cleaning processes could allow the previously contaminated water to be reused within the waterpipe system without having to direct the water to the sewer system. Waterpipe systems that do not have these cleaning processes would likely have a lower contamination threshold.

In embodiments, depending on the contamination level and whether a contamination threshold has been exceeded, waterpipe management system 101 can configure digital twin module 114 to generate a forecast 126 having redirection plan 130. Redirection plan 130 can include a recommendation on how the portion of water should be directed through the waterpipe system. In some embodiments, waterpipe management system 101 can determine that the portion of water is not contaminated. In these embodiments, forecast 126 can include a redirection plan 130 that recommends redirecting the portion of water to an uncontaminated portion of the waterpipe system for reuse. If no contaminants are identified within the portion of water analyzed, then the water can be used for any use (e.g., human consumption). Because some water uses require a higher quality standard (e.g., having few contaminants), such water for human consumption, in some embodiments, redirection plan 130 may include recommendations to place the uncontaminated water within a special reservoir to be sued for those purposes requiring a higher quality standard. It is noted that in various embodiments, a structure (e.g., house, building) could incorporate sensors (e.g., flaps, drains, etc.) and be in communication with the water management system 101, which could then automatically adjust settings for the piping system and then determine/identify when to divert specific waste water (e.g., with a low bacteria count, greywater, etc.) to another location (e.g., a garden, the reservoir, etc.).

In embodiments, waterpipe management system 101 can determine the portion of water does not have one or more contaminates above a contamination threshold further (e.g., the one or more contaminates are below the contamination threshold). In these embodiments, waterpipe management system 101 can determine (e.g., via data collection 112, digital twin module 114, and/or historical repository 120) that neither the type nor concentration of the contaminant results in the contamination threshold being exceeded. In embodiments, waterpipe management system 101 can also determine how the contaminated portion of water can be reused. In these embodiments, digital twin module 114 can generate forecast 126 with redirection plan 130.

In these embodiments, redirection plan 130 can include a recommendation of how the water could be redirected through the waterpipe system for reuse. In some embodiments, redirection plan 130 can also provide recommendations of additional technology add-ons that can be incorporated into the waterpipe system that would aid in "cleaning" the water. In these embodiments, redirection plan 130 can consider the types and concentrations of contaminants and suggest a corresponding technology that could increasing the number of potential purposes the contaminated water could be used for. In some embodiments, redirection plan 130 also considers water scarcity levels when making a recommendation. For example, in situations where there is a significant lack of water available for human consumption, redirection plan 130 can recommend specific technology waterpipe system add-ons that will "clean" the water of contaminants so that the water can be used for this purpose.

In embodiments where waterpipe management system 101 has determined the portion of water has one or more contaminates or concentration of contaminates above a contamination threshold, digital twin module can generate forecast 126 providing that the portion water cannot be repurposed. In some embodiments, forecast 126 can also recommend redirection plan 130. In embodiments where the type and/or concentration of contaminants in a portion of water exceeds the contamination threshold, the redirection plan 130 can recommend directing the water to the sewer system. In some embodiments, waterpipe management system can determine that these contaminants can impact the condition of the waterpipe system and/or should not be released into the sewer system.

For example, if there is a significant concentration of chemical waste a portion of water, releasing this waste could damage the waterpipe system or sewer system and could result in polluting the sewer system. In these embodiments, redirection plan 130 can recommend that the contaminated portion of water is released into a special waste reservoir for the type of waste. This waste can then be removed by the client/user or by a contracting waste removal company. In these embodiments, waterpipe management system 101 can be configured to automatically send out a notification to a client/user or in some situations send out a request to the waste removal company when the contaminated water should be removed from the special waste reservoir.

In embodiments, the forecast 126 generated by digital twin module 114 and configured by waterpipe management system 101 can recommend a new piping design to mitigate the one or more predicted conditions 128 associated with the waterpipe system. In these embodiments, digital twin module 114, input dataset module 110, data collection devices 112, and historical repository 120 can be configured to simulate the generated digital twin 122 to produce forecast 126 with one or more predicted conditions 128 and redirection plan 130. In these embodiments, forecast 126 can identify a condition of the one or more plurality of waterpipe components 116 and/or performance factors that is affecting the waterpipe system. Simulation engine 124 can generate a redirection plan 130 which can include recommendations on how the waterpipe system can be altered to prevent the one or more predicted conditions from occurring, and/or how the waterpipe system design/configuration can be improved upon to reduce water waste and potential waterpipe system failures.

Figure 2:
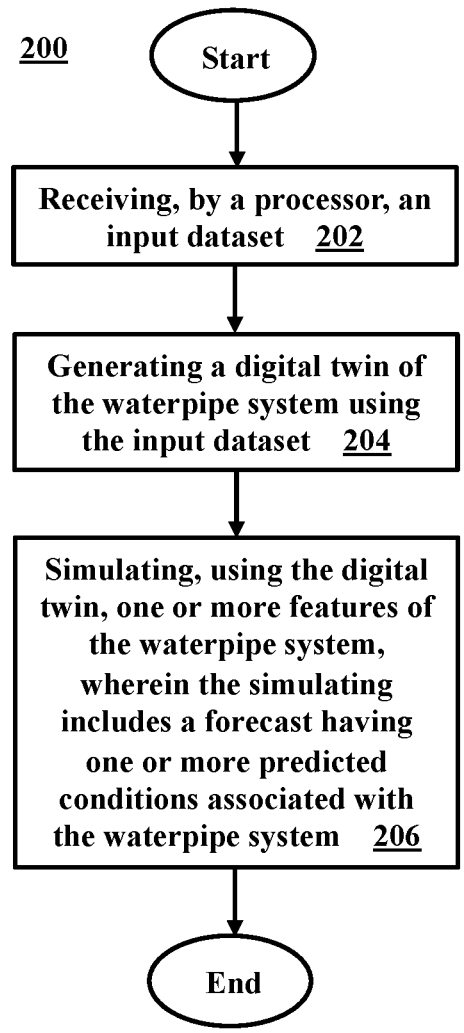
FIG. 2 illustrates a flowchart of a method for identifying communication feed anomalies, in accordance with embodiments of the present disclosure.

Referring now to FIG. 2, a flowchart illustrating an example method 200 for management a waterpipe system, in accordance with embodiments of the present disclosure. In some embodiments, the method 200 may be performed by waterpipe management system 101, as referenced in FIG. 1.

In some embodiments, the method 200 begins at operation 202 where the processor receives an input dataset having a plurality of waterpipe components and performance factors. The method 200 proceeds to operation 204 where the processor generates a digital twin of the waterpipe system of interest using, at least in part, the input dataset. The method 200 proceeds to operation 206 where the processor simulates, using the digital twin, one or more features of the waterpipe system. In embodiments the simulation can include a forecast having one or more predicted conditions associated with the waterpipe system. In some embodiments, as depicted, after operation 206 the method 200 may end.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3A:
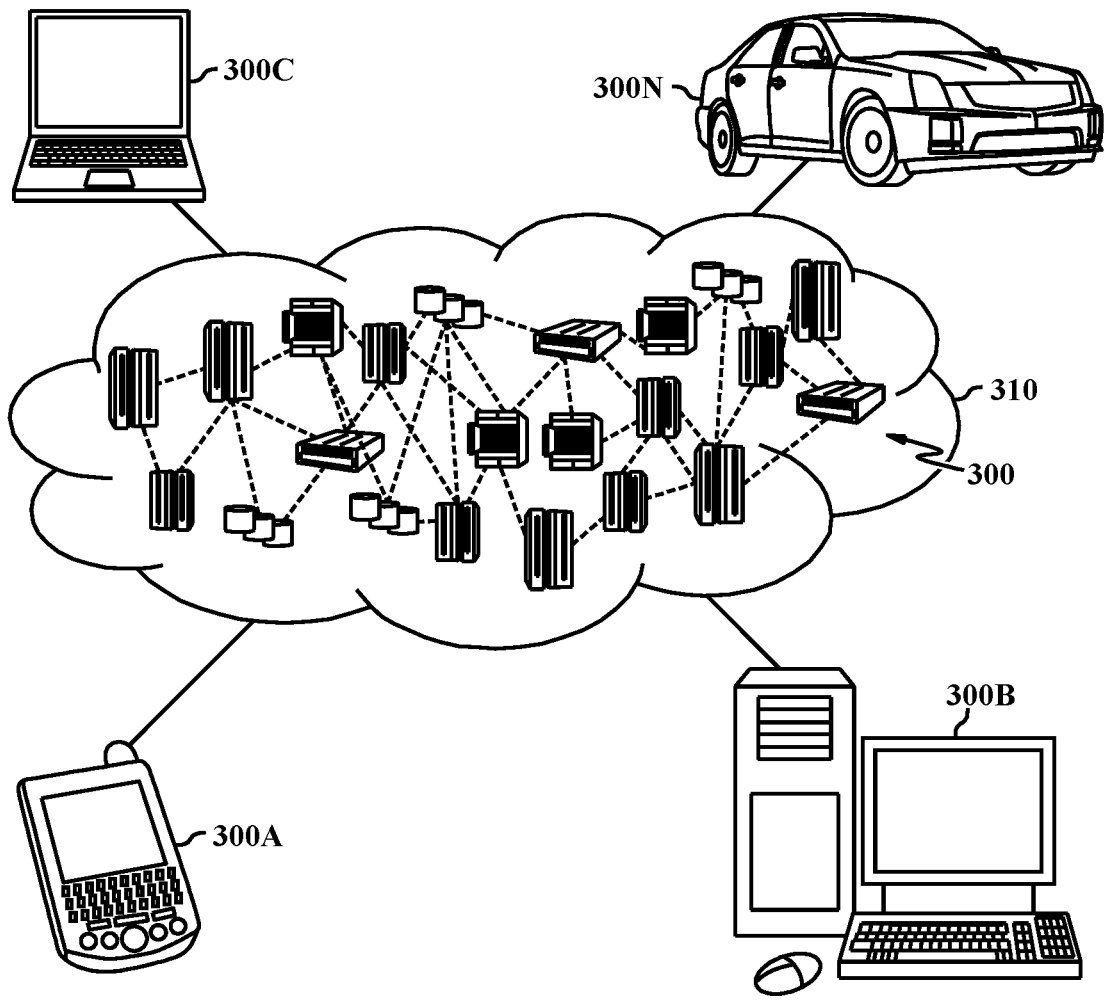
FIG. 3A illustrates a cloud computing environment, in accordance with embodiments of the present disclosure.

Referring now to FIG. 3A, illustrative cloud computing environment 310 is depicted. As shown, cloud computing environment 310 includes one or more cloud computing nodes 300 with which local computing devices used by cloud consumers, such as, for example, personal digital assistant (PDA) or cellular telephone 300A, desktop computer 300B, laptop computer 300C, and/or automobile computer system 300N may communicate. Nodes 300 may communicate with one another. They may be grouped (not shown) physically or virtually, in one or more networks, such as Private, Community, Public, or Hybrid clouds as described hereinabove, or a combination thereof. This allows cloud computing environment 310 to offer infrastructure, platforms and/or software as services for which a cloud consumer does not need to maintain resources on a local computing device. It is understood that the types of computing devices 300A-N shown in FIG. 3A are intended to be illustrative only and that computing nodes 300 and cloud computing 300 and cloud computing environment 310 can communicate with any type of computerized device over any type of network and/or network addressable connection (e.g., using a web browser).

Figure 3B:
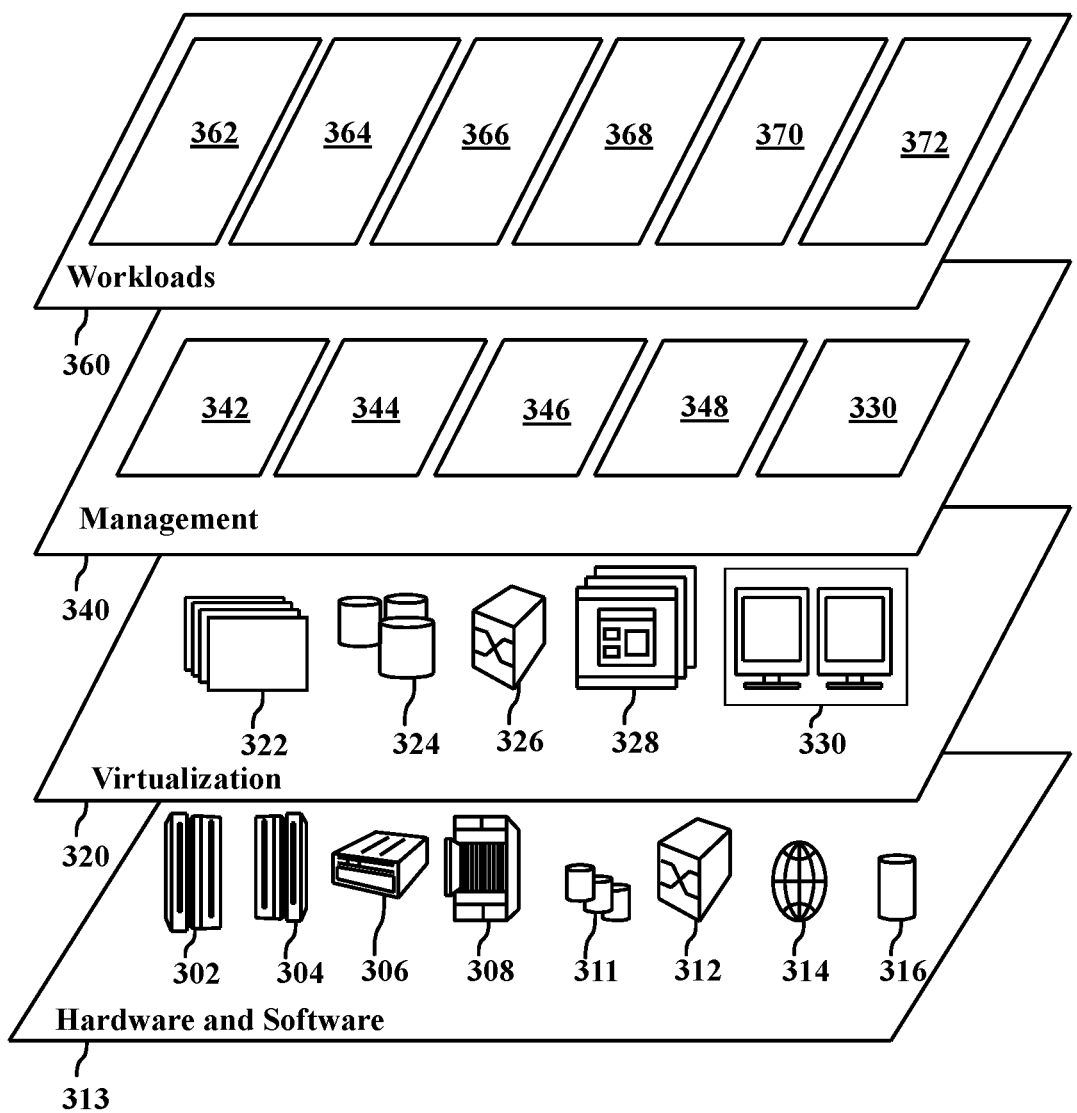
FIG. 3B illustrates abstraction model layers, in accordance with embodiments of the present disclosure.

Referring now to FIG. 3B, a set of functional abstraction layers provided by cloud computing environment 310 (FIG. 3A) is shown. It should be understood in advance that the components, layers, and functions shown in FIG. 3B are intended to be illustrative only and embodiments of the disclosure are not limited thereto. As depicted below, the following layers and corresponding functions are provided.

Hardware and software layer 315 includes hardware and software components. Examples of hardware components include: mainframes 302; RISC (Reduced Instruction Set Computer) architecture based servers 304; servers 306; blade servers 308; storage devices 311; and networks and networking components 312. In some embodiments, software components include network application server software 314 and database software 316.

Virtualization layer 320 provides an abstraction layer from which the following examples of virtual entities may be provided: virtual servers 322; virtual storage 324; virtual networks 326, including virtual private networks; virtual applications and operating systems 328; and virtual clients 330.

In one example, management layer 340 may provide the functions described below. Resource provisioning 342 provides dynamic procurement of computing resources and other resources that are utilized to perform tasks within the cloud computing environment. Metering and Pricing 344 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 346 provides access to the cloud computing environment for consumers and system administrators. Service level management 348 provides cloud computing resource allocation and management such that required service levels are met. Service Level Agreement (SLA) planning and fulfillment 350 provide pre-arrangement for, and procurement of, cloud computing resources for which a future requirement is anticipated in accordance with an SLA.

Workloads layer 360 provides examples of functionality for which the cloud computing environment may be utilized. Examples of workloads and functions which may be provided from this layer include: mapping and navigation 362; software development and lifecycle management 364; virtual classroom education delivery 366; data analytics processing 368; transaction processing 370; and waterpipe system managing 372.

Figure 4:
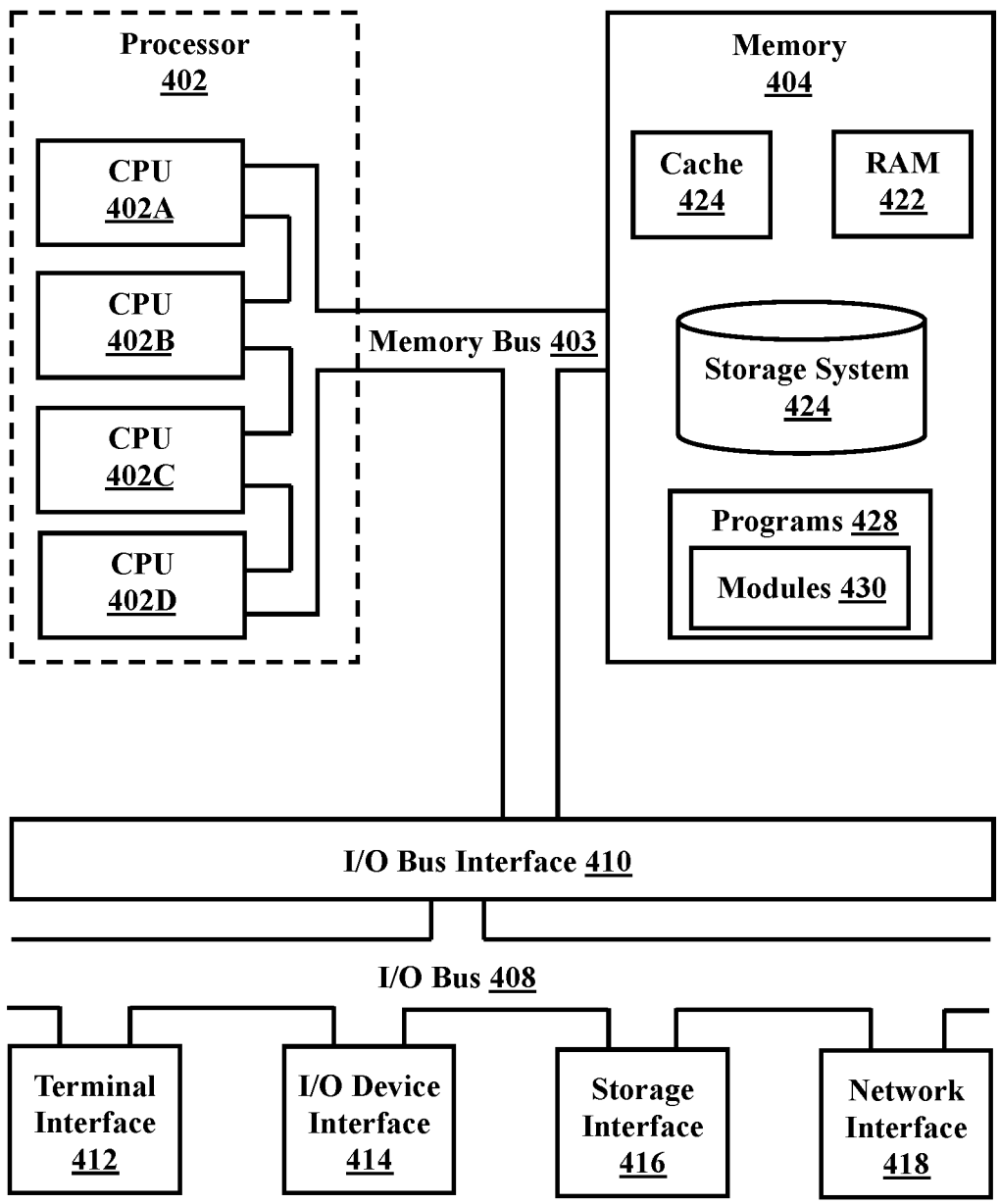
FIG. 4 illustrates a high-level block diagram of an example computer system that may be used in implementing one or more of the methods, tools, and modules, and any related functions, described herein, in accordance with embodiments of the present disclosure.

FIG. 4, illustrated is a high-level block diagram of an example computer system 401 that may be used in implementing one or more of the methods, tools, and modules, and any related functions, described herein (e.g., using one or more processor circuits or computer processors of the computer), in accordance with embodiments of the present invention. In some embodiments, the major components of the computer system 401 may comprise one or more Processor 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smartphone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A method for managing a waterpipe system comprising:
   receiving, by a processor, an input dataset, wherein the input dataset includes a plurality of waterpipe components and one or more performance factors of a waterpipe system;
   generating a digital twin of the waterpipe system using the input dataset;
   simulating, using the digital twin, one or more features of the waterpipe system, wherein the simulating includes a forecast having one or more predicted conditions associated with the waterpipe system;
   analyzing water within the waterpipe system for one or more contaminants;
   identifying technological add-ons associated with the one or more contaminants, wherein the technological add-ons are configured to remove at least a portion of the one or more contaminants from the water
   identifying a portion of the water is contaminated water;
   determining, responsive to simulating the one or more features, the contaminated water will damage the waterpipe system;
   redirecting, via a redirection plan, the contaminated water to a waste reservoir, wherein the waste reservoir prevents pollution associated with the contaminated water; and
   notifying a user to remove the contaminated water from the waste reservoir.

2. The method of claim 1, wherein the input dataset is received from a real-time data feed, and wherein the real-time data feed is connected to one or more of the plurality of components and identifies the one or more performance factors.

3. The method of claim 1, further comprising:
   configuring an historical repository of piping parameters, piping structures, and water conditions based on an historical dataset.

4. The method of claim 3, further comprising:
   updating the historical repository by adding the plurality of components and the one or more performance factors of the input dataset to the historical repository.

5. The method of 4, wherein simulating the feature of the waterpipe system further comprises:
   analyzing the historical repository to identify the forecast.

6. The method of claim 5, wherein the one or more predicted conditions is selected from a group consisting of a replacement of one or more of the plurality of components, repair of one or more plurality of components, maintenance of the waterpipe system, adjusting settings of the waterpipe system, identifying water waste, and identifying water contamination.

7. The method of claim 1, wherein identifying whether the portion of water within the waterpipe system is contaminated water includes:
   identifying an origin of the water;
   analyzing the water for a type and a concentration of one or more contaminates; and
   determining whether the portion of water has one or more contaminates above a contamination threshold.

8. The method of claim 7, wherein responsive to determining whether the portion of water has one or more contaminates above a contamination threshold further includes:
   determining the contaminated water cannot be repurposed; and
   modifying the redirection plan, wherein the redirection plan includes how the contaminated water is redirected to the waste reservoir.

9. The method of claim 7, wherein responsive to determining whether the portion of water does not have one or more contaminates above a contamination threshold further includes:
   determining the contaminated water can be repurposed; and
   modifying the redirection plan, wherein the redirection plan includes how the contaminated water is redirected to a different portion of the waterpipe system for reuse.

10. The method of claim 1, wherein identifying whether the portion of water within the waterpipe system is not contaminated water further includes:
    modifying the redirection plan, wherein the redirection plan includes how the portion of water is redirected to the portion of water to an uncontaminated portion of the waterpipe system for reuse.

11. The method of claim 1, wherein the forecast further includes recommending a new piping design to mitigate the one or more predicted conditions associated with the waterpipe system.

12. A computer system for managing a waterpipe system, the computer system comprising:
    one or more computer processors;
    one or more computer readable storage media;
    computer program instructions;
    the computer program instructions being stored on the one or more computer readable storage media for execution by the one or more computer processors; and
    the computer program instructions including instructions to:
       receive an input dataset, wherein the input dataset includes a plurality of components and one or more performance factors of a waterpipe system;
       generate a digital twin of the waterpipe system using the input dataset;
       simulate, using the digital twin, one or more feature of the waterpipe system,
    wherein the simulating includes a forecast having one or more predicted conditions associated with the waterpipe system;
       analyze water within the waterpipe system for one or more contaminants;
       identify technological add-ons associated with the one or more contaminants, wherein the technological add-ons are configured to remove at least a portion of the one or more contaminants from the water
       identify a portion of the water is contaminated water;
       determine, responsive to simulating the one or more features, the contaminated water will damage the waterpipe system;
       redirect, via a redirection plan, the contaminated water to a waste reservoir,
    wherein the waste reservoir prevents pollution associated with the contaminated water; and
       notifying a user to remove the contaminated water from the waste reservoir.

13. The system of claim 12, wherein identifying whether the portion of water within the waterpipe system is contaminated water includes:
    identifying an origin of the water;
    analyzing the water for a type and a concentration of one or more contaminates; and determining whether the portion of water has one or more contaminates above a contamination threshold.

14. The system of claim 13, wherein responsive to determining whether the portion of water has one or more contaminates above a contamination threshold further includes:
    determining the contaminated water cannot be repurposed; and
    modifying the redirection plan, wherein the redirection plan includes how the contaminated water is redirected to the waste reservoir.

15. The system of claim 13, wherein responsive to determining whether the portion of water does not have one or more contaminates above a contamination threshold further includes:
    determining the contaminated water can be repurposed; and
    modifying the redirection plan, wherein the redirection plan includes how the contaminated water is redirected to a different portion of the waterpipe system for reuse.

16. The system of claim 12, wherein identifying whether the portion of water within the waterpipe system is not contaminated water further includes:
    modifying the redirection plan, wherein the redirection plan includes how the portion of water is redirected to the portion of water to an uncontaminated portion of the waterpipe system for reuse.

17. The system of claim 12, wherein the forecast further includes recommending a new piping design to mitigate the one or more predicted conditions associated with the waterpipe system.

18. A computer program product for managing a waterpipe system, the computer program product comprising one or more computer readable storage media and program instructions stored on the one or more computer readable storage media, the program instructions including instructions to:
    receive, by a processor, an input dataset, wherein the input dataset includes a plurality of components and one or more performance factors of a waterpipe system;
    generate a digital twin of the waterpipe system using the input dataset;
    simulate, using the digital twin, one or more feature of the waterpipe system, wherein the simulating includes a forecast having one or more predicted conditions associated with the waterpipe system;
    analyze water within the waterpipe system for one or more contaminants;
    identify technological add-ons associated with the one or more contaminants, wherein the technological add-ons are configured to remove at least a portion of the one or more contaminants from the water
    identify a portion of the water is contaminated water;
    determine, responsive to simulating the one or more features, the contaminated water will damage the waterpipe system;
    redirect, via a redirection plan, the contaminated water to a waste reservoir, wherein the waste reservoir prevents pollution associated with the contaminated water; and
    notify a user to remove the contaminated water from the waste reservoir.

* * * * *